Figure 1:
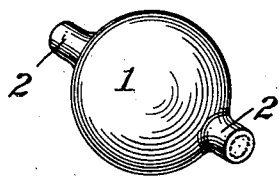

No. 768,944. PATENTED AUG. 30, 1904.
I. F. KEPLER.
HOLLOW RUBBER ARTICLE HAVING NECKS OR PROJECTIONS.
APPLICATION FILED AUG. 31, 1903.
NO MODEL.

WITNESSES:
Donn Twitchell
Frederick A. Blount

INVENTOR
Irvin Floyd Kepler
BY
Seward Davis
ATTORNEY

No. 768,944.

Patented August 30, 1904.

UNITED STATES PATENT OFFICE.

IRWIN FLOYD KEPLER, OF AKRON, OHIO, ASSIGNOR TO THE B. F. GOODRICH COMPANY, OF OHIO, AKRON, OHIO, A CORPORATION OF OHIO.

HOLLOW RUBBER ARTICLE HAVING NECKS OR PROJECTIONS.

SPECIFICATION forming part of Letters Patent No. 768,944, dated August 30, 1904.

Application filed August 31, 1903. Serial No. 171,380. (No model.)

*To all whom it may concern:*

Be it known that I, IRWIN FLOYD KEPLER, a citizen of the United States of America, and a resident of the city of Akron, county of Summit, and State of Ohio, have invented certain new and useful Improvements in Hollow Rubber Articles Having Necks or Projections, of which the following is a specification.

This invention relates to hollow rubber bulbs or analogous articles having one or more necks, projections, or thickened portions for receiving pipe or other connections, and has for its object to provide a stronger, more durable, and less expensive hollow rubber article of this class than has heretofore been produced.

My concurrent patent application filed of even date herewith and having Serial No. 171,378, filed August 31, 1903, shows, describes, and generically claims a hollow rubber ball, bulb, or other article made from a double-walled edge-joined blank cut, preferably, by dies from uncured rubber-compound tubing. A tube formed from uncured-rubber stock properly macerated to uniform consistency and formed under pressure by a tubing-machine has almost uniform molecular structure and homogeneity, its grain or striations being parallel to the axis of the tube. By using suitable mandrel-dies in a tubing-machine a tube may be produced having beads or reinforced portions along its inner or outer length integral with the tube itself and which are similarly striated and molecularly homogeneous. The present invention differs from said prior generic invention by providing a hollow rubber bulb or other article having one or more necks, projections, or thickened portions which are produced from specially-reinforced portions of rubber tubing, from which tubing the uncured bulb-blank is cut and integrally joined at the edges by pressure prior to vulcanizing the blank into an expanded bulb in a suitable mold. When a section of it is sheared off by the cutting edges of the forming-dies or otherwise, the contained air is confined within the tube, and the walls of the bulb-blank or other article are thus distended without additional inflation. Such inflation has been effected heretofore by injecting air into the article by means of a hollow needle, with which the blank is pierced, and the hole thus formed has been closed by gum or cement. The air-bags of uncured stock formed from a tube merely by shearing the tube are further distended by the immediately-following action of the pressing-die, which in compressing the marginal areas tends to confine the air to more limited space, and thus increase the distention of the bulb or other article and renders subsequent inflation unnecessary.

Reference is made to the accompanying drawings, forming part of this specification, and in which—

Figure 2:
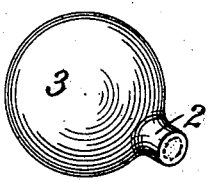
Figure 3:
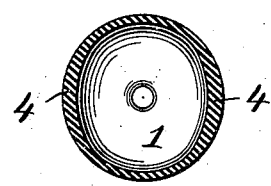
Figure 4:
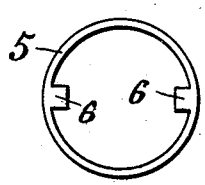
Figure 5:
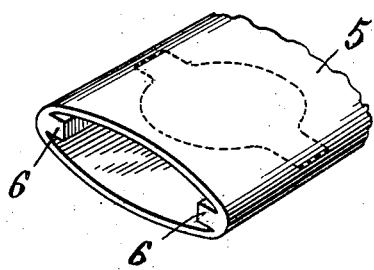
Figure 6:
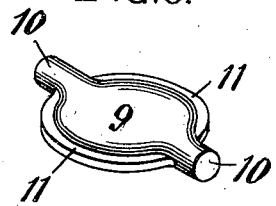
Figure 7:
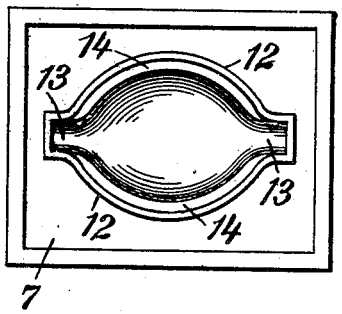
Figure 8:
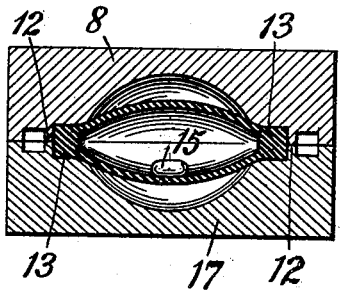
Figure 9:
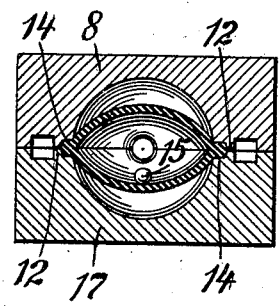
Figure 10:
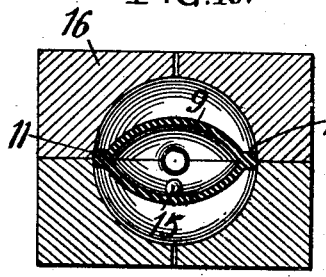

Figure 1 is a perspective view of a bulb made in accordance with my invention and having two necks or exterior projections. Fig. 2 shows a bulb having but one neck. Fig. 3 is a cross-section through either of these bulbs. Fig. 4 is an end view of specially-reinforced rubber-compound tubing from which the double-necked bulb or analogous hollow article is produced. Fig. 5 is a perspective view of a piece of this tubing flattened preparatory to cutting from it the double-necked bulb-blank shown in Fig. 6, the method of cutting the blank being indicated by its dotted outline on the tubing of Fig. 5. Fig. 7 is a face view of one of the two similar halves of the bulb-blank cutting and edge-joining die, both halves of which are shown in longitudinal section in Fig. 8 and in transverse section in Fig. 9. Fig. 10 shows in cross-section the mold in which the bulb-blank is vulcanized; and Figs. 11 and 12, respectively, are transverse and longitudinal sections of the mold with the bulb fully expanded to its walls after vulcanization.

In Fig. 1 of the drawings the vulcanized-rubber bulb 1 has two oppositely-disposed exteriorly-projecting necks 2 2, and in Fig. 2 the bulb 3 has but one neck or projection 2. These necks are later bored out, as indicated by the dotted lines, preparatory to connecting pipes or other necessary adjuncts of a syringe, atomizer, or other complete structure with which the bulb is to be incorporated. Fig. 3 of the drawings shows that the bulb-body wall at opposite side portions 4 4 is thickened to give increased strength and also stronger expanding force after deflation; but this wall may be made of uniform thickness throughout.

Figure 11:
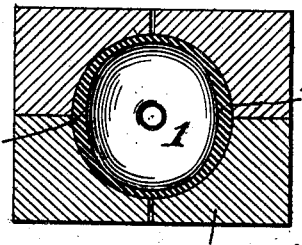
Figure 12:
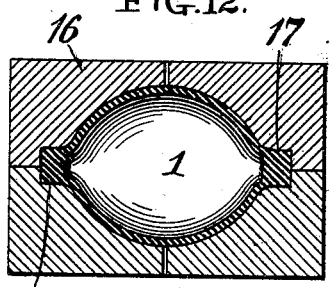

In making the double-necked bulb shown in Fig. 1 of the drawings I use rubber-compound tubing 5. (Seen in end view in Fig. 4 and in flattened perspective in Fig. 5 of the drawings.) This tubing is specially reinforced at places from which the two bulb-necks 2 2 are produced, said reinforce consisting, preferably, of internal ribs or flanges 6 6, produced as the rubber-compound stock is forced through mandrel-dies to make the tubing in the preferred manner. The dotted outline of the uncured bulb-blank on the flattened tubing in Fig. 5 of the drawings indicates how this tubing is laid between the two blank-cutting and edge-joining die-sections 7 8 (shown in Figs. 8 and 9 of the drawings) and which when brought together produce from the reinforced tubing the bulb-blank 9. (Shown in Fig. 6 of the drawings.) This blank has two opposite solid end necks 10 10 and two opposite solid or homogeneous side edges 11 11. The acting faces of both die-sections are made alike and, as shown in Fig. 7 of the drawings, each having a cutting edge 12, which marginally shapes the bulb-blank 9, two end concavities 13 13, which form the solid bulb-blank necks 10 10, and two side recesses 14 14, which compress and integrally unite the opposing walls of the rubber tubing to form the blank edgings 11 11. Prior to cutting or pressing the blank 9 from the uncured-rubber tubing a capsule 15, of ammoniacal compound or other gas-generating substance, is placed in said tubing, so as to be confined within the blank after the latter is formed by the dies. This die-formed and capsule-charged blank 9 then is placed within a mold 16 (shown in Figs. 10, 11, and 12 of the drawings) and having concavities 17 17, receiving the blank-necks 2 2. Fig. 10 of the drawings shows the uncured blank within the mold, and Figs. 11 and 12 show the bulb fully inflated to the formative walls of the mold after vulcanization is completed. Fig. 11 of the drawings, like Fig. 3, shows the increased thickness of the vulcanized bulb-wall at 4 4, due to the expansion of the opposite integrally-compressed edge portions 11 11 of the uncured blank under outward pressure of gas or vapor generated from the capsule 15 during vulcanization. Should such increased wall thickness at 4 not be desired, it may be avoided by narrowing the die recesses or shoulders 14 to produce narrower homogeneously-joined edgings 11 on the blank.

In producing the single-necked bulb-blank shown in Fig. 2 of the drawings from die-drawn tubing having but one neck-reinforcing rib 6 the cutting and edge-compressing die will be shaped to form an integrally-united edging 11 all around the blank except at its neck, which is formed from the reinforced portion of the tubing, and this blank then will be vulcanized in a suitably-shaped mold, as will readily be understood without special illustration.

A hollow rubber bulb or analogous article formed from rubber-compound tubing having special reinforcement at places from which the bulb-necks, projections, or thickened portions are produced when cutting or pressing a double-walled edge-joined blank from said tubing and later vulcanized, as above described, is much stronger at the necks or projections and adjacent parts and also is less expensive to make, because said reinforcement of the tubing infallibly provides ample material to assure formation of solid necks on the bulb-blank without overstraining the side wall portions of the blank, and the necessity of inserting separately-formed plugs or other reinforcement at neck or thickened portions of the uncured bulb-blank is obviated. The increased strength of the necks or thickened portions when bored out also assures more secure connection of pipes or other necessary fixtures to the finished bulb when it is incorporated in an atomizer, syringe, or other finished product.

It is immaterial whether the bulb or other hollow rubber article has one or more necks projecting outwardly or inwardly to receive pipe or other connections or whether the bulb has simply increased wall thickness of rubber compound where such connections are to be made, the particular form of these reinforced portions of the bulb or article depending largely on the character of the connections and the particular use of the bulb in any special finished product. It is within the scope of my invention if the article made is produced from longitudinally-reinforced tubing die-drawn from rubber stock. It will therefore be obvious that the particular location and cross-sectional form of the rubber-compound reinforcement of the tubing depend largely upon the character of the bulb and its special use, it being unimportant whether this reinforcement be provided along the interior or exterior of the uncured rubber-compound tubing from which the bulbs or like articles are produced.

I claim as my invention—

1. A vulcanized hollow rubber bulb or analogous article having one or more necks, projections or thickened portions made from reinforced parts of uncured-rubber tubing, from which tubing the bulb or article is initially formed by pressure as a double-walled edge-joined blank prior to vulcanization, substantially as described.

2. A vulcanized hollow rubber bulb or analogous article having one or more necks, projections or thickened portions made from reinforced parts of uncured-rubber tubing, from which tubing the bulb or article is initially formed by die-pressure as a double-walled edge-joined blank prior to vulcanization, substantially as described.

3. A vulcanized hollow rubber bulb or analogous article having one or more necks, projections or thickened portions made from reinforced parts of uncured die-drawn rubber tubing, from which tubing the bulb or article is initially formed by pressure as a double-walled edge-joined blank prior to vulcanization, substantially as described.

4. A vulcanized hollow rubber bulb or analogous article having one or more necks, projections or thickened portions made from reinforced parts of uncured die-drawn rubber tubing, from which tubing the bulb or article is initially formed by die-pressure as a double-walled edge-joined blank prior to vulcanization, substantially as described.

5. A vulcanized hollow rubber bulb or analogous article having one or more necks, projections or thickened portions produced from uncured-rubber tubing reinforced in drawing in parts corresponding to said necks, projections or thickened portions, substantially as described.

6. A seamless, vulcanized, hollow rubber bulb having one or more projections or necks integral therewith and having been formed from a seamless die-drawn tubing having reinforced parts or beads, substantially as described.

7. A vulcanized bulb or analogous article of striated rubber having one or more necks, projections or thickened portions, integral therewith, shaped from uncured-rubber tubing, having reinforced parts or beads.

8. A jointless vulcanized-rubber bulb, having a neck or necks, composed of expanded parts of a reinforced rubber tube, substantially as described.

9. A seamless vulcanized-rubber bulb having necks or stems integral therewith and being the expanded wall of a seamless beaded or reinforced rubber tube, substantially as described.

IRWIN FLOYD KEPLER.

Witnesses:
 HARRY A. BAUMAN,
 WILLIAM A. MEANS.